Feb. 28, 1950     F. G. CORRELL     2,498,914
KICK SHIFTER ATTACHMENT
Filed April 27, 1946     2 Sheets-Sheet 2
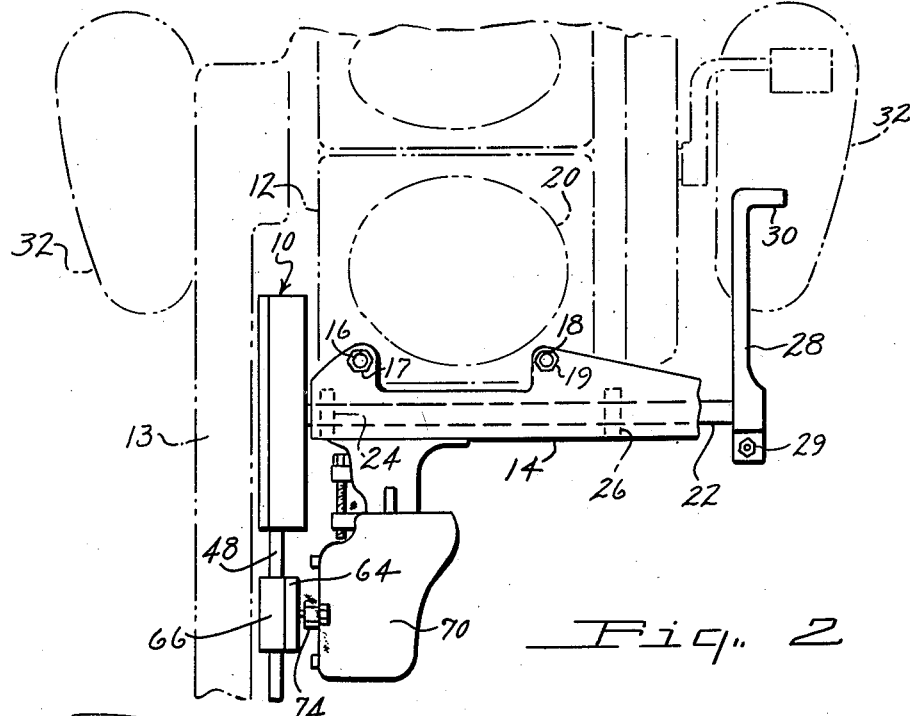
Fig. 2
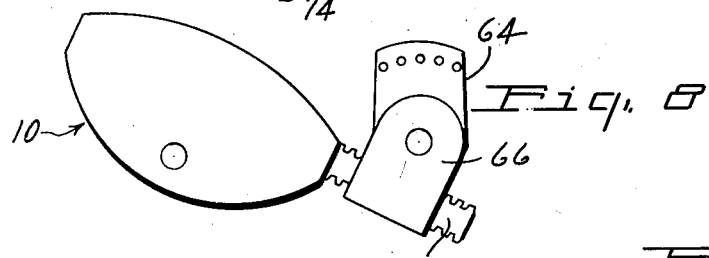
Fig. 8
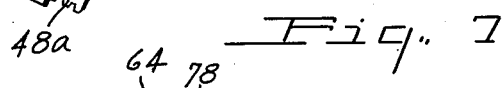
Fig. 7
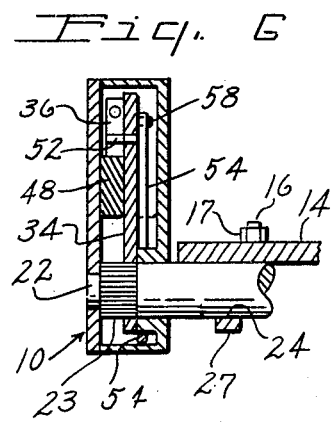
Fig. 6
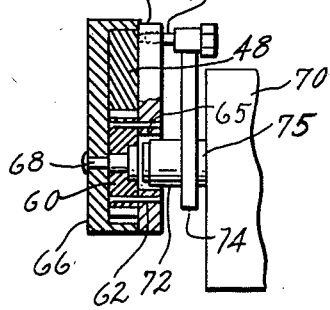
INVENTOR.
Francis G. Correll
BY Mason & Graham
Attys.

Patented Feb. 28, 1950

2,498,914

UNITED STATES PATENT OFFICE 2,498,914

KICK SHIFTER ATTACHMENT

Francis G. Correll, Los Angeles, Calif.

Application April 27, 1946, Serial No. 665,544

9 Claims. (Cl. 74—474)

This invention relates to gear shifting mechanism for operating change speed gears arranged on the "straight through" system in which the gears are meshed in sequence to obtain successively higher speeds by repeated movements of an operating lever in one direction and to engage successively lower gears by repeated movements of the lever in the opposite direction.

The invention is particularly designed for motorcycles and, for explanatory purposes, is hereinafter specifically described with relation to a well known make of motorcycle having a gear box providing a low gear, second, third and high gears, and with a neutral position, but the gear shifting mechanism may be readily adapted to other makes of motorcycles or other automotive vehicles having change speed gears of the "straight through" type.

In motorcycling, particularly when using motorcycles with high powered engines, it is important that the rider should be able to maintain a firm grip on the handlebars at all times, since, particularly in racing, the motorcycle is often subject to excessive bumping. It is further desirable that the gears should be positively and accurately engaged at each change of speed, notwithstanding the rough conditions under which the motorcycle is operated.

It is an object of the invention to provide a change speed gear operating mechanism particularly designed for motorcycles, which is operated solely by a raising or lowering movement of a lever operated by the rider's foot, thus enabling the rider to maintain a grip with both hands on the handlebars.

It is a further object of the invention to provide a change speed gear operating mechanism of the foot operated type which is simple and rugged in construction.

It is a further object of the invention to provide a change speed gear operating mechanism of the type described which is rapid and positive in operation.

It is still another object of the invention to provide a change speed gear operating mechanism which may be readily adapted to different makes of motorcycles or other automotive vehicles fitted with a straight through gear.

Still another object of the invention is to provide a positive adjustment of connecting means arranged between the change speed gear operating mechanism and the gear box of the vehicle to assure accurate functioning of the operating mechanism after adjusting the gear box consequent on taking up wear of the driving chains of a motorcycle.

Still further objects and features of the invention will appear from the following description taken in conjunction with the accompanying drawings, in which:

Fig. 2 is a plan view showing the arrangement of the parts of the change speed gear operating mechanism and their arrangement on the motorcycle;

Fig. 3 is a view partly in section of the interior of casings housing operating mechanism for the change speed operating mechanism with the cover plate of one of the casings removed and the other casing sectioned;

Fig. 4 is a front view, to a larger scale, of an operating member connecting the change speed operating mechanism to an element forming part of the standard gear box of the motorcycle;

Fig. 5 is a rear view of the operating member shown in Fig. 3;

Fig. 6 is a section on line 6—6 of Fig. 1;

Fig. 7 is a section to a larger scale on line 7—7 of Fig. 1; and

Fig. 8 is a fragmentary elevation showing a modified form of the invention.

Figure 1:
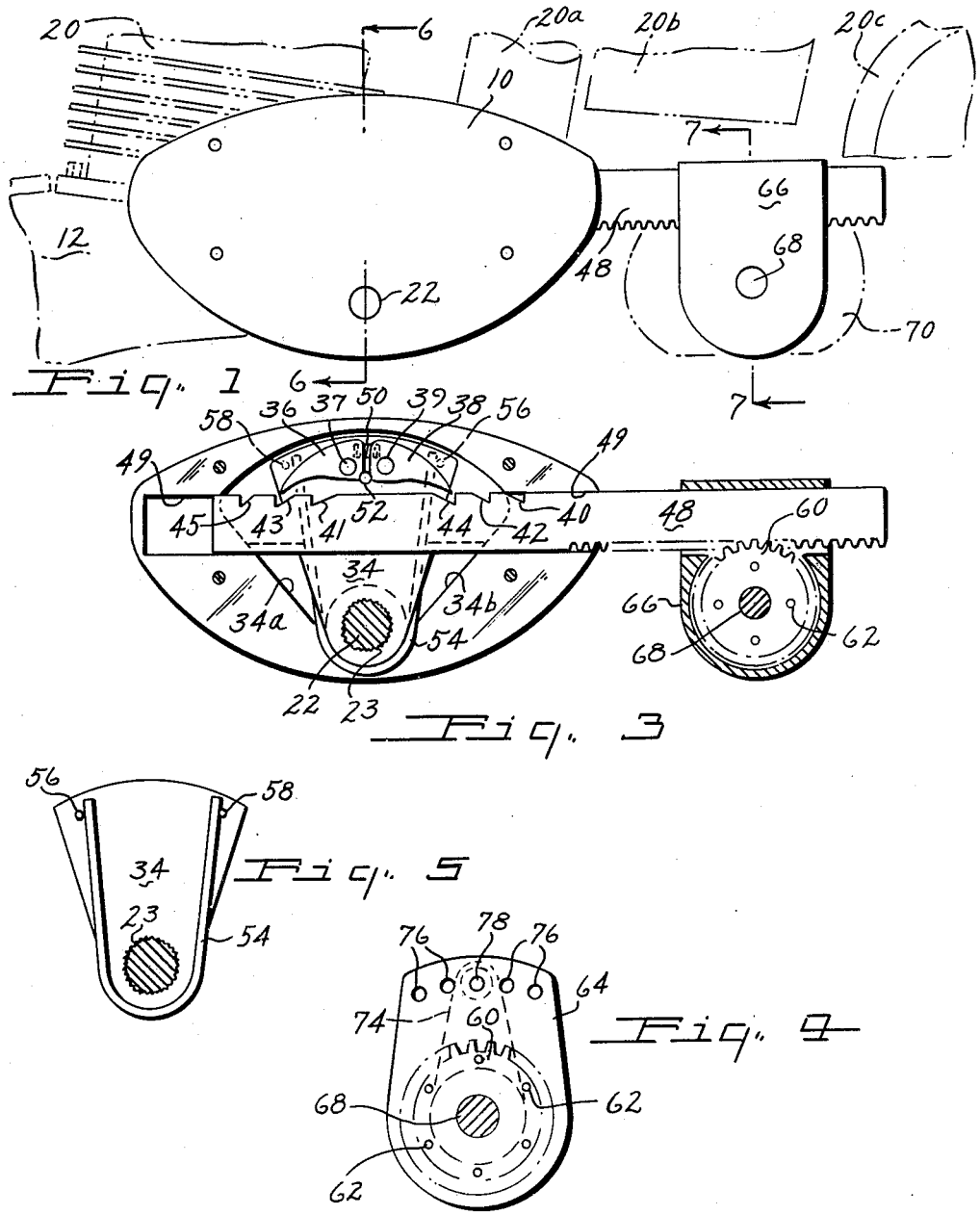
Fig. 1 is an elevation of the change speed gear operating mechanism of the invention fitted to a motorcycle of a well known make.

In applying the gear shift operating mechanism of the invention to "straight through" gear boxes having a hand operated gear shift, as is the case in the motorcycle to which the invention is applied by way of example in the following description, the hand operated rods and levers are discarded.

In the drawings, the numeral 10 indicates a casing mounted at the side of the crank case 12 and between the crank case and chain casing 13 by means of a bracket 14 having holes therein registering with the rear mounting studs 16, 18 for the rear cylinder 20 of the two-cylinder engine shown. The bracket 14 is clamped in place by the rear mounting nuts 17, 19 mounted on the studs for the rear cylinder. The gear shift operating mechanism forms a unit extending from the crank case to the gear case 10, as shown in Fig. 1. in which the rear down frame tube, battery box and rear mudguard are indicated at 20a, 20b and 20c, respectively.

An operating shaft 22 is supported in bearings 24, 26 formed in flanges 27 projecting from the underside of the bracket 14 and an actuating or foot lever 28 is mounted on the end of the operating shaft, the free end of the lever being formed into a crank 30 to enable the lever 28 to be operated by the driver's foot. The butt end of the foot lever is adjustably mounted by clamping the slotted end by a bolt and nut 29 on operating shaft 22 so that the height of the crank above the footrest 32 may be adjusted to suit the rider. The cranked portion of the operating lever is located about the middle of the right footrest 32 and at a level such that the rider may readily pass the toe of his shoe below the crank or press down on the upper surface of the crank.

The operating shaft 22 passes into the casing 10, which is free to rock on the shaft, and is rigidly secured to a pawl carrying plate 34 by pressing the plate, which is provided with a hole having a serrated periphery, on the serrated end 23 of the shaft 22. Plate 34 carries a pair of pawls 36, 38 pivoted on pins 37, 39, projecting from the plate and adapted to engage in two series of notches 40, 42, 44 and 41, 43, 45 formed in the back of a rack 48 mounted for longitudinal sliding movement in a slot or slideway 49 machined in the casing 10.

The pawls 36, 38 are urged toward the back of the rack by means of a spring 50 engaging in recesses formed in each pawl above their pivotal axes. The heel portions of the pawls rest against a pin 52 projecting from the plate 34 and serving to hold the pawl not in use away from the back of the rack. The extent of the movement of the pawl carrying plate 34 is limited by the walls 34a and 34b of the casing in which it is mounted so that the movement is sufficient only to fully engage the gears of one speed at each movement of the pawl carrying plate.

A U-shaped spring 54 is arranged in a recess surrounding the lower end of the plate and engages with pins 56, 58 projecting from the back of the plate 34 (Fig. 5). The action of the spring is to normally hold the plate vertical with the pawls 36, 38 disengaged from the notches in the back of the rack, the operating shaft 22 and foot lever 28 also being rotated by the spring acting through plate 34, to initial position when upward or downward pressure is removed from the operating lever 28.

The rack 48 extends rearwardly from the casing 10 and engages a pinion 60 secured by rivets 62 to a gear shifting arm 64 (Fig. 4). The pinion 60 is fitted in a recess provided in a support and rack guide 66 formed to extend over the front vertical face and back of the rack and hold the rack in engagement with the pinion. The pinion 60 is mounted on a shaft 68 riveted to the support 66 and the assembly, namely support 66, pinion 60 and gear shifting arm 64, is located with respect to the usual gear box 70 of the motorcycle by a hole concentric about the axis of shaft 68, in the gear shifting arm 64 by which the arm is fitted to rock on a heavy washer 72 which is mounted on the end of a shaft 75 projecting from the gear case 70 on which shaft gear shift lever 74 is secured.

Parts 70, 72, 74 and 75 are standard structure in the motorcycle to which the gear shift actuating mechanism is fitted.

A plurality of threaded bores 76 are formed in the upper end of the gear shift arm 64 and a headed pin 78 projecting through a plain bore in the gear shifting lever 74 is secured in one of said threaded bores. The described connection of gear shifting lever 74 and gear shifting arm 64 is the only direct connection between the support and rack guide 66 and the gear box. This construction provides a smoothly working arrangement of parts free from danger of becoming jammed by weaving of the motorcycle frame or during operation of the parts.

The plurality of holes 76 enables the arm 64 to be correctly connected to gear shift lever 74 after tightening the driving chains (not shown) of the motorcycle by moving the gear box 70.

The back of the rack is provided, as before described, with the two series of three notches, one series being engaged successively by the pawl 36 on movement of the plate in one direction to secure successive engagement of gears in a series of steps giving increase in speed upward from low gear through second and third to high gear and the second series of notches being adapted to be engaged by the pawl 38 on movement of plate 34 in the opposite direction to secure a successive series of gears in a series of steps giving decrease in speed of the motorcycle down from high speed to the low speed gear.

The gear shift operating mechanism of the invention does not include any provision for placing the gears on the gear box in neutral position since in ordinary driving or in racing neutral is not used. Therefore, while the engine is running, the gears will be ordinarily engaged at either the low, second, third or high speed ratios. However, a neutral position is provided in the standard gear box and the rider can, should he so desire, place the gear in the neutral position provided in the gear box between low and first gears by "feeling" for it by moving the rack slightly back and forth.

In the following example it is assumed that the low speed gear is engaged, the operating plate 34 having returned to neutral position, but that the motorcycle is standing still, the rider holding the usual clutch in position to disengage the engine from the transmission. It is further assumed that the plate 34 is standing in neutral position with the pawl 36 resting between notches 43 and 41, the pawl 38 being above notch 44, in which position the operating lever 28 is in approximately horizontal position.

The rider will raise the cranked end 30 of the lever with the toe of his shoe as far as possible. This movement of the lever will turn the operating shaft 22 clockwise, moving the plate 34 in the same direction, causing pawl 38 to be forced into the notch 44 and rearward movement of rack 48 and insuring that the low speed gear is fully engaged. The clutch is then engaged to permit the motorcycle to move forward. The rider next presses the crank 30 downwardly, causing pawl 36 to engage in notch 45, which will move the rack forwardly, causing the pinion 60 to rotate counterclockwise and to move the gear shift member 64 which will operate the gear lever 74, causing engagement of the second speed gears, after which the rider releases pressure on crank 30, thus enabling spring 54 to withdraw pawl 36 from notch 45. As soon as the motorcycle has accelerated sufficiently to enable third gear to be engaged, the rider again will press the crank operating lever downwardly and move pawl 36 into notch 43. The above described procedure is repeated until the high speed gear has been engaged.

To return to low gear, the rider will go through the movements described but in the reverse order; that is to say, to engage the third speed gear from high speed, he will raise up on the crank 30, thus reversing the direction of travel of the rack and engaging in succession the third gear, then second gear, and finally the low gear. On removing pressure from the lever after engaging the low speed gears and releasing the operating lever, the pawl carrying plate 34 will automatically return to neutral position, leaving the low speed gears engaged.

The manipulation of controls other than the gear shifting mechanism when changing gear, once the vehicle has been placed in motion, has not been described since it forms no part of the invention.

Some riders may prefer to change gears upwardly by raising the cranked operating lever instead of pressing downwardly on it and in order to enable the device to be so operated I may arrange the rack 48a (Fig. 8) with rack teeth and notches in both edges. The rack so formed may then be engaged with the pinion 60 at its lower side, the casing and rack guide 66 being freed from arm 74 and the rack 48a freed from the casing, which can then be rotated downwardly and the rack again placed in position with the arm 64 in its original position and arm 64 reconnected to lever 74. The casing 10 can follow the change of position of the rack, the operating lever 28 being then adjusted on the operating shaft.

It will be seen that the foot operated or "kick" gear changing mechanism of my invention provides a positive, fast working but simple and rugged mechanism particularly adapted for use in motorcycle racing.

I claim:

1. For use on a motorcycle or the like having a variable speed transmission, means for adjusting said transmission to effect speed changes thereof comprising a plate, means for pivotally supporting said plate on the motorcycle, a rack, means for supporting said rack for longitudinal movement with a portion thereof adjacent said plate, pawl means on said plate for releasable engagement with said rack for imparting longitudinal movement to said rack in response to swinging movement of said plate about its pivotal axis, an actuating lever operatively connected to said plate, and means cooperating with said rack and transmission to effect speed change adjustment thereof in response to axial movement of said rack.

2. For use on a motorcycle or the like having a variable speed transmission, means for adjusting said transmission to effect speed changes thereof comprising a plate, means for pivotally supporting said plate on the motorcycle, a rack, means for supporting said rack for longitudinal movement with a portion thereof adjacent said plate, pawl means on said plate for releasable engagement with said rack for imparting longitudinal movement to said rack in response to swinging movement of said plate about its pivotal axis, an actuating lever operatively connected to said rack, and means cooperating with said rack and transmission to effect speed change adjustment thereof in response to axial movement of said rack, said last named means comprising a pinion meshing with said rack and operatively connected to said transmission.

3. For use on a motorcycle or the like having a variable speed transmission including a gear shift lever, means for adjusting said transmission to effect speed changes thereof comprising a plate, means for pivotally supporting said plate on the motorcycle, a rack, said rack having two opposed sets of ratchet teeth, a casing housing said plate and providing a slideway for said rack, double acting pawl means on said plate for selective engagement with said teeth for imparting longitudinal movement to said rack in a desired direction in response to swinging movement of said plate in a given direction, an actuating lever operatively connected to said plate, and a pinion operatively connected to the gear shift lever and meshing with the rack whereby said gear shift lever is operated in response to axial movement of said rack.

4. The combination as set forth in claim 3 in which spring means is provided for urging said plate into a neutral position with the pawl means thereof out of engagement with said rack.

5. The combination as set forth in claim 3 in which the operative connection between the pinion and the gear shift lever comprises a plate rigidly connected to the pinion and adjustably connected to the gear shift lever.

6. The combination as set forth in claim 3 in which said double acting pawl means comprises a pair of oppositely directed pawls pivoted on said member, spring means urging said pawls toward the rack, and stop means cooperating with the pawls to limit their movement towards the rack.

7. For use on a motorcycle or the like having a variable speed transmission, means for adjusting said transmission to effect speed changes thereof comprising a plate, means for pivotally supporting said plate on the motorcycle, an elongated bar-like member mounted for movement relative to said plate, said member having two sets of opposed notches in one edge portion thereof, a pair of pawls mounted on said plate and adapted for engagement respectively with the individual notches of the respective sets of notches for imparting movement to said member in response to swinging movement of said plate, and means operatively connecting said member to an element of said transmission to effect a speed change adjustment thereof.

8. For use on a motorcycle or the like having a variable speed transmission including a gear shift lever, means for adjusting said transmission to effect speed changes thereof comprising a plate, means for pivotally supporting said plate on the motorcycle, a rack, said rack having two opposed sets of ratchet teeth, a casing housing said plate and providing a slideway for said rack, means forming part of said casing for limiting pivotal movement of said plate relative to the casing, double acting pawl means on said plate for selective engagement with said teeth for imparting longitudinal movement to said rack in a desired direction in response to swinging movement of said plate in a given direction, an actuating lever operatively connected to said plate, and a pinion operatively connected to the gear shift lever and meshing with the rack whereby said gear shift lever is operated in response to axial movement of said rack.

9. For use on a motorcycle or the like having a variable speed transmission and having mounting studs projecting from the engine, a bracket mounted on said studs, an operating shaft rotatably supported in said bracket and extending transversely of the motorcycle, an actuating lever on one end of said shaft, a plate rigidly mounted on the other end of said shaft, a casing rotatably supported on said shaft forming a housing enclosing said plate, said casing having a slideway terminating in an opening for slidably supporting a rack adjacent said plate, a rack mounted in said slideway and projecting from said casing, said rack being provided with two series of opposed notches in the region thereof adjacent said plate, a pair of pawls carried by said plate for engagement with the notches of said series of notches respectively in response to swinging movement of said plate, and a pinion operatively connected to said transmission meshing with the rack.

FRANCIS G. CORRELL.

REFERENCES CITED

The following references are of record in the file of this patent:

UNITED STATES PATENTS

| Number | Name | Date |
|---|---|---|
| 1,201,806 | Cook | Oct. 17, 1916 |
| 1,959,476 | Janik | May 22, 1934 |
| 2,094,163 | Weber | Sept. 28, 1937 |

FOREIGN PATENTS

| Number | Country | Date |
|---|---|---|
| 523,174 | Great Britain | July 8, 1940 |